US 6,698,176 B2

(12) United States Patent
Scott

(10) Patent No.: US 6,698,176 B2
(45) Date of Patent: Mar. 2, 2004

(54) MULTIPLE SAW PRUNING APPARATUS

(76) Inventor: Phillip Ray Scott, 29846 Corral Ct. North, Coarse Gold, CA (US) 93614

( * ) Notice: Subject to any disclaimer, the term of this patent is extended or adjusted under 35 U.S.C. 154(b) by 47 days.

(21) Appl. No.: 10/041,807

(22) Filed: Jan. 7, 2002

(65) Prior Publication Data

US 2003/0126849 A1 Jul. 10, 2003

(51) Int. Cl.⁷ .............................................. A01D 34/73
(52) U.S. Cl. ....................... 56/235; 56/255; 56/DIG. 20
(58) Field of Search ........................... 56/233, 234, 235, 56/237, 255, 256, 295, DIG. 20

(56) References Cited

U.S. PATENT DOCUMENTS

| | | | | |
|---|---|---|---|---|
| 2,592,755 A | * | 4/1952 | Soenksen | 56/295 |
| 2,926,480 A | * | 3/1960 | Kimball | 56/235 |
| 3,246,460 A | * | 4/1966 | Patterson et al. | 56/295 |
| 3,327,460 A | * | 6/1967 | Blackstone | 56/295 |
| 3,415,047 A | * | 12/1968 | Blecke | 56/295 |
| 3,500,622 A | * | 3/1970 | Bowen | 56/295 |
| 3,894,385 A | * | 7/1975 | Brown, Jr. | 56/295 |
| 4,043,104 A | * | 8/1977 | Jones | 56/295 |
| 4,922,698 A | * | 5/1990 | Taylor | 56/295 |
| 5,438,819 A | * | 8/1995 | Dallman | 56/295 |
| 6,385,951 B1 | * | 5/2002 | Ogawa | 56/16.7 |

FOREIGN PATENT DOCUMENTS

| FR | 2230285 | * 12/1974 | 56/233 |
|---|---|---|---|

OTHER PUBLICATIONS

Brochure—L.D. David, no date.
Brochure—Red Head Mfg, no date.
Brochure—Tol Inc., 1/98.

* cited by examiner

Primary Examiner—Árpad Fabian Kovács
Assistant Examiner—Alicia Torres
(74) Attorney, Agent, or Firm—Henry M. Stanley

(57) ABSTRACT

An inexpensive and readily available pruning blade for pruning crop growth, such as grape vines following harvest, has a disc-like base plate. The base plate has ordinary small diameter radial Skil-saw blades mounted around the periphery. The saw blades are fixed rotationally on the base plate by a clamp and have a portion of the saw teeth extending beyond the base plate periphery so that rotation of the base plate induces cutting action by the saw teeth at the periphery of the base plate. When the extending saw teeth become dull, the clamp is loosened, the saw blade is rotated through an arc sufficient to expose sharp teeth at the base plate periphery, and the clamp is tightened.

10 Claims, 2 Drawing Sheets

MULTIPLE SAW PRUNING APPARATUS

SUMMARY OF THE INVENTION

The disclosed invention relates to apparatus for mounting on a mobile vehicle for pruning branches of vines and bushes or trees in a ground growing crop including a pruning blade and means carried on the mobile vehicle for mounting the pruning blade for rotational movement in a predetermined position relative to the vines and bushes. The pruning blade includes a base plate that has a periphery and a center of rotation adapted to engage the means for mounting. Also included is a plurality of cutting members having peripheral cutting surfaces together with means for releasably fixing the plurality of cutting members around the periphery of the base plate in spaced position so that portions of the peripheral cutting surfaces extend beyond the base plate periphery.

In another aspect of the invention, a pruning blade is adapted to be mounted on a rotating drive shaft for use in mechanically pruning vines and bushes of a row-grown field crop, wherein the blade includes a flat base plate having a periphery and a centrally located opening for engagement by the rotating drive shaft. Also included is a plurality of cutting members having peripheral cutting surfaces, and means for releasable fastening the cutting members in spaced relation around the periphery of the base plate so that the peripheral cutting surfaces extend beyond the periphery of the base plate.

In a further aspect of the invention, apparatus is provided for pruning branches of vines and bushes of a ground growing crop wherein a vehicle for traversing the ground has a power source with a driver connected to the power source. A drive shaft is coupled to the driver at one end and has an opposing free end for positioning adjacent the crop. The improvement includes a base plate having a periphery and a centrally located attachment point for accepting and affixing the base plate to the drive shaft free end. A plurality of cutting members has peripheral cutting surfaces. Also included is means for releasably fastening the cutting members in spaced relation around the periphery of the base plate so that the peripheral cutting surfaces extend beyond the periphery of the base plate.

DESCRIPTION OF THE PREFERRED EMBODIMENTS

Continuing efforts are made to reduce the costs of producing crops such as wine grapes. The cost of pruning an acre of wine grapes runs from $200–$250 when the pruning is done with hand labor. There are currently in existence several styles of mechanized pruning machines. Some machines use sickle-style cutters, much like the sickle cutters used to harvest hay. Other mechanized pruning machines have used large radial-style saw blades and yet other pruning machines have used a straight steel blade much like that seen on a lawnmower.

The foregoing mechanical pruning machines have several weak points. One of the things that growers of wine grapes want is a clean, smooth cut. It is undesirable to have a cut that shatters the end of the wood. As blades wear and become dull, the quality of the cut decreases. Large radial style saw blades in pruners have to be removed and resharpened. This requires a grower to have extra sets of large radial style saw blades which are very expensive. Without the extra sets the grower must idle his pruning crew while the saw blade is being sharpened. Further, as a vineyard is being pruned, the blades or cutters may come into contact with steel stakes as well as very hard, high tensile strength wire. The blades are immediately dulled when they contact such items.

Figure 1:
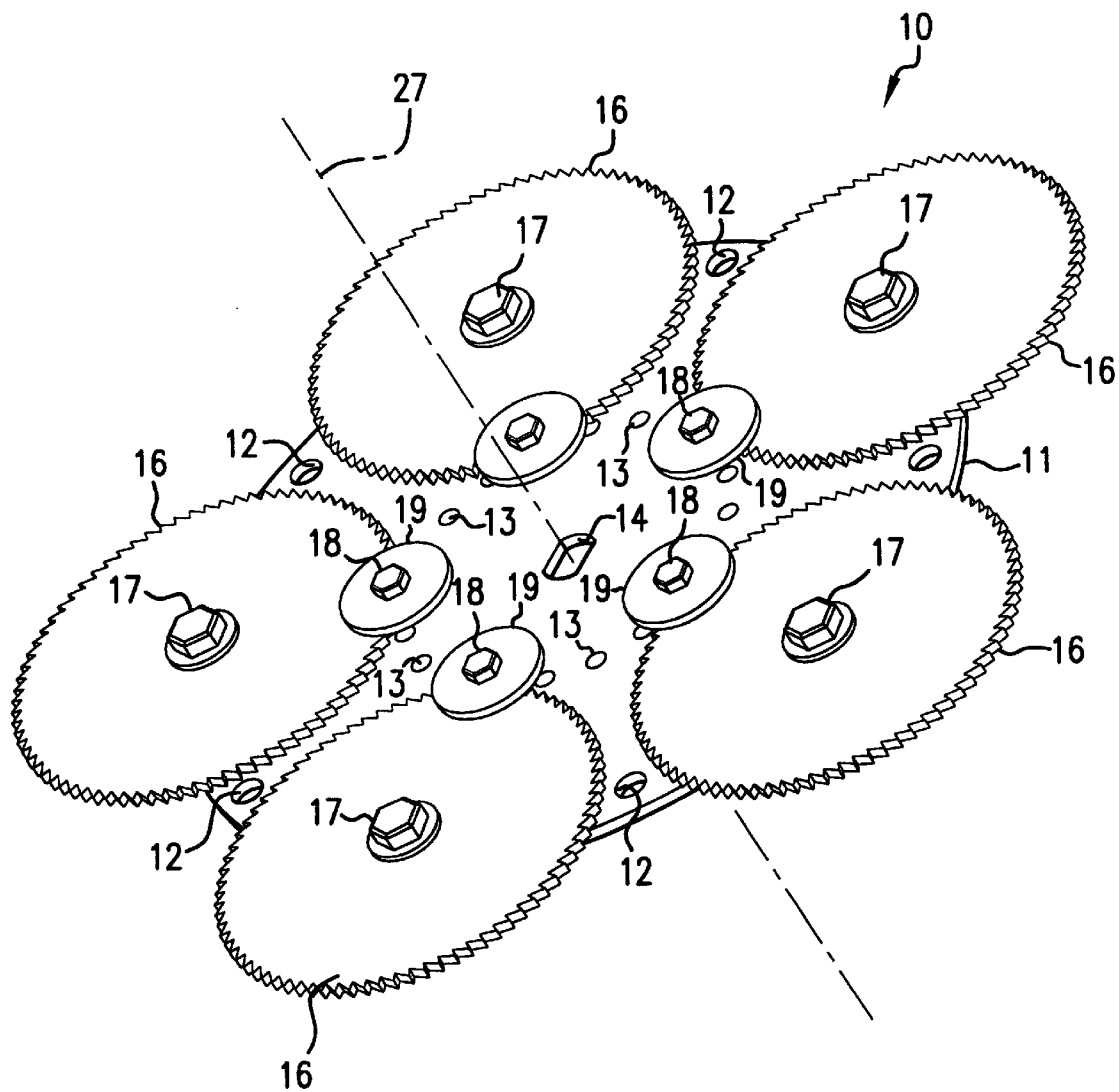
FIG. 1 is a perspective of a preferred embodiment of the present invention.

The present invention uses the most common radial saw blade made. Seven and one quarter-inch Skil-Saw blades are preferred. They are inexpensive and readily available. Moreover, multiple 7-¼ inch saw blades are much cheaper than one large diameter saw blade. Additionally, it proves to be very expensive to re-sharpen large diameter saw blades. Referring now to FIG. 1 of the drawings, the pruning blade assembly of the present invention is shown at 10 having a base plate 11. A plurality of holes 12, some of which are visible in FIG. 1, are arranged about the periphery of the base plate 11. There is also an inner circle of holes 13 in the base plate as well as a center opening 14.

A number of small diameter radial saw blades 16 are seen positioned in spaced relationship around the periphery of the base plate 11. The small diameter saw blades are held in position by means of fasteners 17 that extend through centrally located holes (not shown) located on an axis of rotation of each of the small diameter saw blades and through one of the holes 12 in the base plate. The fasteners 17 are engaged at a free end by a threaded nut (not shown) if they extend to the opposite side of the base plate, or by threads formed in the holes 12. Any other holding device will serve. While each individual small radial saw blade 16 is held in position on the periphery of the base plate 11 by a fastener 17, each blade 16 is prevented from rotating about its axis by another fastener 18 that extends through one of the holes 13 in the base plate. The fastener 18 is engaged at the opposite side of the base plate by a holding device such as a nut or the like (not shown). FIG. 1 illustrates a washer-like member 19 that is placed under the head and around the shank of the fastener 18. The edge of the washer 19 extends radially from the fastener 18 to overlap the periphery of an adjacent saw blade 16 and thereby fix the saw blade rotationally.

It may be seen from FIG. 1 that a greater or fewer number of saw blades 16 may be affixed on the periphery of the base plate 11 depending on the cutting requirement for the pruning job to be undertaken. Adding a greater number of smaller diameter saw blades to the periphery of the base plate 11 will provide a cutting edge that is more continuous for certain pruning purposes and placing a smaller number of saw blades 16 on the periphery of the base plate will provide fewer teeth for the pruning operation in accordance with different desired pruning results. Moreover, the tooth design on the saw blades 16 may be changed to provide either a coarse cut or a fine cut or a combination of several types of blade teeth may be provided, again depending on the pruning job requirements. In any event, when the exposed teeth extending from the periphery of the base plate 11 become dulled through use or as a result of contact with objects other than the vines or branches to be pruned, the fastener 17 may be loosened as necessary and then the fastener 18 may be loosened to relieve pressure on the washer 19. The saw blade 16 may then be rotated through an arc to present new and sharp teeth along the portion of the saw blade that extends outwardly from the periphery of the base plate 11. Since only a portion of the blade is in use at any one time, the saw blades may be rotated as described herein several times to provide a new group of sharp saw teeth for performing the pruning operation before the saw blade needs replacement. Common 7-¼ inch Skil-saw blades cost less than $3.00 each. A 30–40 inch diameter pruning saw blade costs anywhere from $300 to $500. The saw blades 16 may simply be discarded once the teeth are dulled after several positions of the saw blade are assumed, while the more expensive large diameter pruning saw blades are so expensive that they are usually sent to be re-sharpened.

Figure 2:
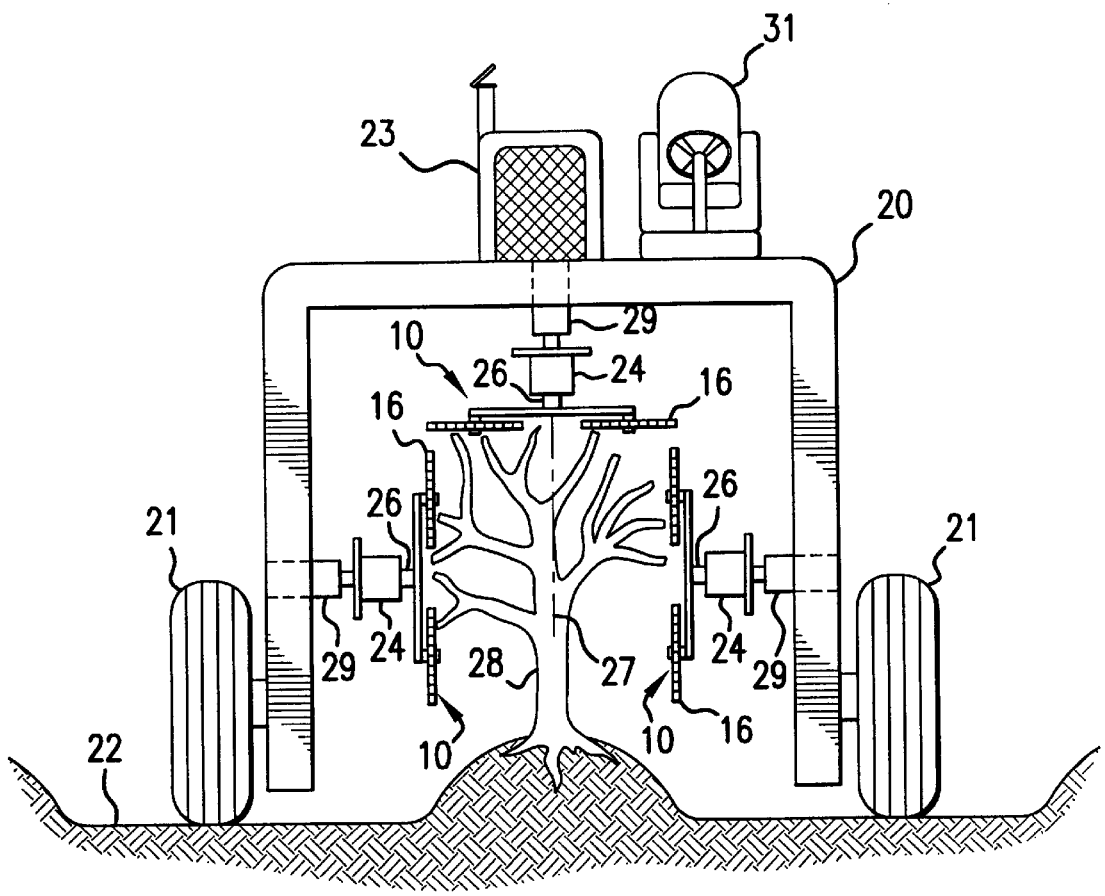
FIG. 2 is an elevation of a mobile vehicle illustrating one manner of using the present invention.

FIG. 2 is a rudimentary drawing of a crop harvester, similar to a harvester used to harvest vine-grown crops such as grapes. The harvester includes an inverted "U" shaped frame 20 that has wheels 21 for contacting the ground 22, thereby allowing the harvester to traverse over the ground. A power source 23 is mounted on the harvester frame providing power which is transferred to a driver 24, such as a hydraulic motor having an output shaft 26 extending therefrom. The output shaft 26 in the embodiment shown extends along an axis 27 (FIG. 1) that passes through the center of rotation of the pruning assembly 10.

In the depiction of FIG. 2 a vine row, represented by the single vine trunk 28 and attached branches, is approached from both sides and the top by pruning assemblies 10 that are driven to rotate about their axes 27 when connected to the ends of the shafts 26. The pruning assemblies 10 are positioned toward and away from the vines to be pruned by a known positioning assembly 29, one for each pruning assembly. The positioning assemblies are represented in FIG. 2 as hydraulic cylinders that position each pruning assembly 10 closer to or farther from the row of vines to be pruned. FIG. 2 is representative of one configuration of pruning assemblies 10, it being understood that one or two pruning assemblies may be all that is required for any particular pruning operation. The entire operation is controlled from an operator's station 31 located on top of the inverted "U" shaped frame 20.

Figure 3:
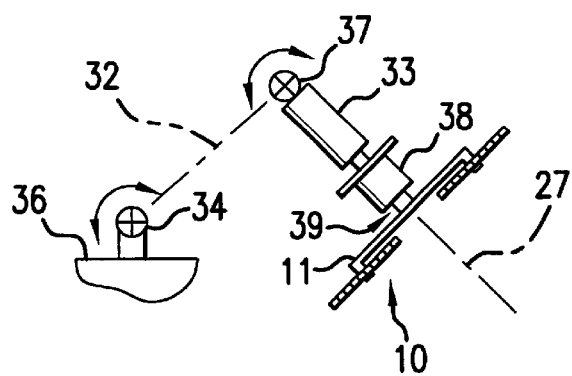
FIG. 3 is a diagrammatic depiction of another manner of using the present invention.

FIG. 3 shows an articulated arm that includes a first arm section 32 and a second arm section 33. The second arm section 33 is depicted as part of the hydraulic positioning assembly 29 shown in FIG. 2. One end of the arm 32 is mounted at a pivot 34 attached to a frame 36 on a mobile vehicle used in harvesting operations. The free end of the arm 32 has a pivot 37 thereon to which is attached the second arm section 33. Power is provided from a power source, similar to that described in FIG. 2, to a driver such as a hydraulic motor 38 (similar to motor 24) that is mounted near the free end of the articulated arm. An output shaft 39 extends from the motor 38 and provides rotational drive for the pruning assembly 10. The pruning assembly is thereby rotated about the axis 27 at a predetermined speed depending upon the requirements of a particular pruning operation. It should be noted that the positioning devices shown as items 29 in FIG. 2 and as item 33 in FIG. 3 are controlled by positioning sensors (not shown), sometimes termed "row finders" in harvesting machinery parlance. These devices are included in this disclosure solely for the purpose of showing the environment in which the invention is useful as disclosed and claimed herein.

Although the best mode contemplated for carrying out the present invention has been shown and described herein, it will be understood that modification and variation may be made without departing from what is regarded to be the subject matter of the invention.

What is claimed:

1. An apparatus for mounting on a mobile vehicle for pruning branches of vines and bushes or trees in a ground growing crop, comprising:

a pruning blade, and means carried on the mobile vehicle for mounting said pruning blade for rotational movement in a predetermined position relative to the vines and bushes, said pruning blade further comprising a base plate having a periphery and a center of rotation for engaging said means for mounting, a plurality of cutting members having peripheral cutting surfaces, means for releasably fixing said plurality of cutting members in spaced positions along the periphery of said base plate so that portions of said peripheral cutting surfaces extend beyond said base plate periphery, wherein said means for releasably fixing said plurality of cutting members comprises a first releasable fastener for fixing said cutting member in peripheral position on said base plate, a second releasable fastener for fixing said cutting member in rotational position on said base plate, wherein said second releasable fastener comprises threaded members spaced from said cutting members for engaging said base plate, and a hold-down member engaged by each of said threaded members and engaging one of said cutting member peripheral cutting surfaces.

2. An apparatus as in claim 1 wherein said hold down member comprises a washer member.

3. An apparatus as in claim 1 wherein said hold down member comprises a member constructed of material having a hardness less than said cutting member peripheral cutting surface.

4. A pruning blade adapted to be mounted on a rotating drive shaft for use in mechanically pruning vines and bushes of a row-grown field crop, comprising:

a flat base plate having a periphery and a centrally located opening for engagement by the rotating drive shaft, a plurality of cutting members having peripheral cutting surfaces, and means for releasably fastening said cutting members in spaced relation around the periphery of said base plate so that the peripheral cutting surfaces extend beyond the periphery of said base plate, wherein said means for releasably fastening comprises first releasable fasteners for fixing said plurality of cutting members at discrete positions on said base plate, and second releasable fasteners for fixing said plurality of cutting members in rotational position on said base plate, wherein said second releasable fasteners comprise threaded members spaced from said cutting members for engaging said flat base plate, and hold-down members engaged by said threaded members for engaging one of said peripheral cutting surfaces.

5. The pruning blade of claim 4 wherein said hold-down members comprise washer members.

6. The pruning blade of wherein said plurality of cutting members comprises a plurality of circular saw blades.

7. An apparatus for pruning branches of vines and bushes of a ground growing crop wherein a vehicle for traversing the ground has a power source with a driver connected to the power source, and further has a drive shaft coupled to the driver at one end and having a free end for positioning adjacent the crop, the improvement comprising:

a base plate having a periphery and a centrally located attachment point for accepting the drive shaft free end, a plurality of cutting members having peripheral cutting surfaces, and means for releasably fastening said cutting members in spaced relation around the periphery of said base plate so that the peripheral cutting surfaces extend beyond the periphery of said base plate, wherein said means for releasably fastening comprises first releasable fasteners for fixing said plurality of cutting members in discrete positions on said base plate, and second releasable fasteners for fixing said plurality of cutting members in rotational positions on said base plate, wherein said second releasable fasteners comprise fastener members spaced from said cutting members for engaging said flat base plate, and hold-down members engaged by said fastener members and engaging said peripheral cutting surfaces.

8. The apparatus of claim 7 wherein said plurality of cutting members comprise a plurality of disc shaped saw blades.

9. The apparatus of claim 8 wherein said plurality of disc shaped saw blades comprises a plurality of seven inch diameter saw blades.

10. The apparatus of claim 7 wherein said hold-down members comprise washer members.

* * * * *